United States Patent
Park et al.

(10) Patent No.: US 12,150,047 B2
(45) Date of Patent: Nov. 19, 2024

(54) APPARATUS AND METHOD FOR NETWORK AUTOMATION IN WIRELESS COMMUNICATION SYSTEM

(71) Applicant: Samsung Electronics Co., Ltd., Suwon-si (KR)

(72) Inventors: Jungshin Park, Suwon-si (KR); Yoonseon Han, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/153,668

(22) Filed: Jan. 12, 2023

(65) Prior Publication Data

US 2023/0147409 A1 May 11, 2023

Related U.S. Application Data

(63) Continuation of application No. 17/011,139, filed on Sep. 3, 2020, now Pat. No. 11,558,813.

(30) Foreign Application Priority Data

Sep. 6, 2019 (KR) .......... 10-2019-0111090

(51) Int. Cl.
*H04W 48/18* (2009.01)
*H04B 7/06* (2006.01)
(Continued)

(52) U.S. Cl.
CPC .......... *H04W 48/18* (2013.01); *H04B 7/0626* (2013.01); *H04L 12/56* (2013.01); *H04L 69/322* (2013.01); *H04W 24/10* (2013.01)

(58) Field of Classification Search
CPC ..... H04W 48/18; H04W 24/10; H04W 36/34; H04W 48/16; H04W 60/00; H04W 8/08;
(Continued)

(56) References Cited

U.S. PATENT DOCUMENTS

| 9,462,019 B1 | 10/2016 | Rosenzweig |
| 10,791,508 B2 | 9/2020 | Park et al. |

(Continued)

FOREIGN PATENT DOCUMENTS

| CN | 109964509 A | 7/2019 |
| CN | 109982391 A | 7/2019 |

(Continued)

OTHER PUBLICATIONS

3rd Generation Partnership Project; Technical Specification Group Services and System Aspects; Study of Enablers for Network Automation for 5G (Release 16), 3GPP TR 23.791 V16.2.0, Jun. 11, 2019, ections 6.9.1.1- 6.9.1.2, 6.11.1.1 (Year: 2019).*

(Continued)

*Primary Examiner* — Hardikkumar D Patel
(74) *Attorney, Agent, or Firm* — Jefferson IP Law, LLP

(57) ABSTRACT

Disclosed is a 5$^{th}$ generation (5G) or a pre-5G communication system provided to support a higher data transmission rate than that of post-4$^{th}$ generation (4G) communication systems, such as long term evolution (LTE). A method of operating a network node in a wireless communication system is provided. The method includes receiving, from a plurality of first network nodes, network data, generating first recommendation operation information for a second network node based on the network data, and transmitting, to the second network node, a first analysis result message including the first recommendation operation information.

6 Claims, 9 Drawing Sheets

(51) Int. Cl.
*H04L 12/54* (2022.01)
*H04L 69/322* (2022.01)
*H04W 24/10* (2009.01)

(58) Field of Classification Search
CPC ..... H04W 36/14; H04W 48/08; H04W 28/08; H04W 40/02; H04W 84/12; H04W 36/22; H04B 7/0626; H04B 7/0619; H04B 7/024; H04L 12/56; H04L 69/322; H04L 5/0073; H04L 67/14; H04L 67/16; H04L 47/125; G06F 21/6254; G06F 16/23; G06F 16/9535; G06F 21/6245; G06N 5/025

See application file for complete search history.

(56) References Cited

U.S. PATENT DOCUMENTS

| | | | |
|---|---|---|---|
| 11,503,496 | B2 | 11/2022 | Xin et al. |
| 2004/0083232 | A1 | 4/2004 | Ronnewinkel et al. |
| 2015/0263906 | A1 | 9/2015 | Kasturi et al. |
| 2015/0286842 | A1* | 10/2015 | Mori .............. G06F 21/6245 726/30 |
| 2016/0301579 | A1 | 10/2016 | Djukic et al. |
| 2018/0262924 | A1 | 9/2018 | Dao et al. |
| 2018/0270715 | A1 | 9/2018 | Lee et al. |
| 2018/0341885 | A1 | 11/2018 | Kaulgud et al. |
| 2019/0116631 | A1 | 4/2019 | Talebi Fard et al. |
| 2019/0222489 | A1 | 7/2019 | Shan |
| 2021/0014141 | A1* | 1/2021 | Patil .................. H04W 76/25 |
| 2021/0266765 | A1* | 8/2021 | Zhang ................ H04W 24/02 |

FOREIGN PATENT DOCUMENTS

| | | |
|---|---|---|
| EP | 2 919 128 A1 | 9/2015 |
| WO | 2014/073214 A1 | 5/2014 |
| WO | 2018/002247 A1 | 1/2018 |
| WO | 2019/032968 A1 | 2/2019 |
| WO | 2019/158737 A1 | 8/2019 |
| WO | 2019/158777 A1 | 8/2019 |

OTHER PUBLICATIONS

3rd Generation Partnership Project; Technical Specification Group Services and System Aspects; Study of Enablers for Network Automation for 5G (Release 16), 3GPP TR 23.791 V16.2.0, Jun. 11, 2019, sections 6.9.1.1-6.9.1.2, 6.11.1.1.

3rd Generation Partnership Project; Technical Specification Group Services and System Aspects; Architecture enhancements for 5G System (5GS) to support network data analytics services (Release 16), 3GPP TS 23.288 V16.0.0, Jun. 11, 2019, section 6.7.5.

3rd Generation Partnership Project; Technical Specification Group Services and System Aspects; Telecommunication management; Study on management aspects of communication services (Release 16), 3GPP TR 28.805 V1.1.0, Jul. 10, 2019, section 5.1.

International Search Report dated Dec. 8, 2020, issued in International Application No. PCT/KR2020/011864.

Korean Office Action dated Jul. 1, 2021, issued in Korean Application No. 10-2019-0111090.

3rd Generation Partnership Project; Technical Specification Group Services and System Aspects; System Architecture for the 5G System; Stage 2 (Release 16), 3GPP Draft, 3GPP TS 23.501 V16.1.0 (May 2019), Jun. 11, 2019, KP051751775.

Korean Notice of Patent Grant dated Jul. 7, 2022, issued in Korean Patent Application No. 10-2019-0111090.

Extended European Search Report dated Sep. 8, 2022, issued in European Patent Application No. 20861210.1.

SA WG2, Presentation of TR 23.791: 'Study of Enablers for Network Automation for 5G (Rel-16)' for approval, SP-181108, TSG SA Meeting #SP-82, Dec. 12-14, 2018.

Chinese Office Action dated Mar. 30, 2024, issued in Chinese Patent Application No. 202080062723.8.

* cited by examiner

APPARATUS AND METHOD FOR NETWORK AUTOMATION IN WIRELESS COMMUNICATION SYSTEM

CROSS-REFERENCE TO RELATED APPLICATION(S)

This application a continuation application of prior application Ser. No. 17/011,139, filed on Sep. 3, 2020, which is based on and claims priority under 35 U.S.C. § 119(a) of a Korean patent application number 10-2019-0111090, filed on Sep. 6, 2019, in the Korean Intellectual Property Office, the disclosure of which is incorporated by reference herein in its entirety.

BACKGROUND

1. Field

The disclosure relates to a wireless communication system. More particularly, to an apparatus and a method for network automation in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post long term evolution (LTE) System".

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shifting keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

Meanwhile, a need for a method of automating management of a 5G mobile communication network has recently appeared.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for network automation in a wireless communication system.

Additional aspects will be set forth in part in the description which follows and, in part, will be apparent from the description, or may be learned by practice of the presented embodiments.

In accordance with an aspect of the disclosure, a method of operating a network node in a wireless communication system is provided. The method includes receiving, from a plurality of first network nodes, network data, generating first recommendation operation information for a second network node based on the network data, and transmitting, to the second network node, a first analysis result message including the first recommendation operation information.

In accordance with another aspect of the disclosure, an apparatus of network node in a wireless communication system is provided. The apparatus includes a transceiver, and at least one processor coupled to the transceiver, the at least one processor is configured to receive, from a plurality of first network nodes, network data, generate first recommendation operation information for a second network node based on the network data, and transmit, to the second network node, a first analysis result message including the first recommendation operation information.

According to various embodiments, it is possible to provide an apparatus and a method for network automation in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for providing subscription data to a non-subscriber user equipment (UE) in a wireless communication system.

Terms referring to a signal used in the following description, terms referring to a channel, terms referring to control information, terms referring to network entities, and terms referring to elements of a device are used only for convenience of description. Accordingly, the disclosure is not limited to those terms, and other terms having the same technical meanings may be used.

Further, the disclosure describes various embodiments using the terms used in some communication standards (for example, 3'-generation partnership project (3GPP)), but this is only an example. Various embodiments may be easily modified and applied to other communication systems.

Figure 1:
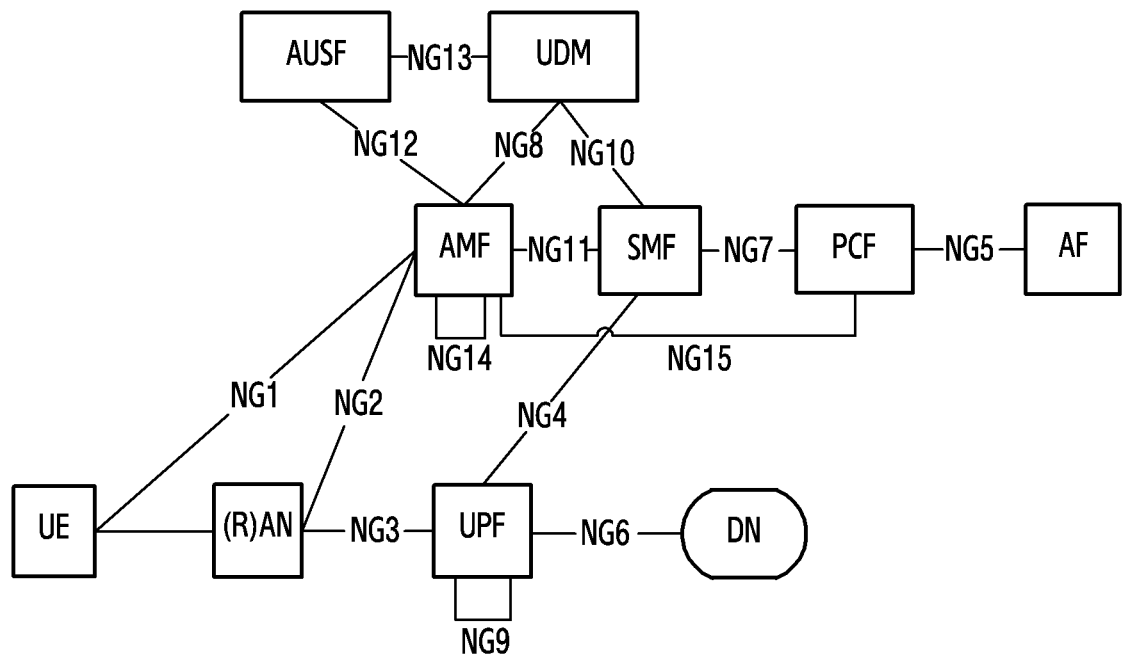
FIG. 1 illustrates a $5^{th}$ generation (5G) system architecture using a reference point expression in a wireless communication system according to an embodiment of the disclosure.

FIG. 1 illustrates a 5G system architecture using a reference point expression in a wireless communication system according to an embodiment of the disclosure.

Referring to FIG. 1, the 5G system architecture may include various elements (that is, network functions (NFs), and FIG. 1 illustrates some of the functions corresponding to an authentication server function (AUSF), a (core) access and mobility management function (AMF), a session management function (SMF), a policy control function (PCF), an application function (AF), unified data management (UDM), a data network (DN), a user plane function (UPF), a (radio) access network ((R)AN), and a terminal, that is, a user equipment (UE).

The respective NFs support the following functions.

The AUSF stores data for authenticating the UE.

The AMF may provide a function of providing access in units of UEs and managing mobility and may be basically connected to one AMF per UE.

Specifically, the AMF supports functions, such as signaling between code network (CN) nodes for movement between 3GPP access networks, termination of a Radio Access Network (RAN) communications processor (CP) interface (that is, an NG2 interface), termination of non-access stratum (NAS) signaling (NG1), NAS signaling security (NAS ciphering and integrity protection), AS security control, registration management (registration area management), connection management, idle mode UE reachability (including control and performance of paging re-transmission), mobility management control (subscription and policy), supporting of intra-system mobility and inter-system mobility, supporting of network slicing, SMF selection, lawful intercept) (for an AMF event and interface to an LI system), provision of transmission of a session management (SM) message between the UE and the SMF, a transparent proxy for SM message routing, access authentication, access authorization including roaming authority check, provision of transmission of an SMS message between the UE and the SMS Function (SMSF), a security anchor function (SAF), and/or security context management (SCM).

Some or all of the functions of the AMF may be supported within a single instance of one AMF.

The DN is for example, operator service, Internet access, or $3^{rd}$ parity service. The DN transmits a downlink protocol data unit (PDU) to the UPF or receives a PDU transmitted from the UE from the UPF.

The PCF receives information on flow of packets from an application server and provides a function of determining a policy of mobility management and session management. Specifically, the PCF supports a function of supporting a unified policy framework for controlling network operation, providing a policy rule to allow CP function(s) (for example, the AMF, the SMF, and the like) to try the policy rule, and implementing a front end for accessing relevant subscription information to determine a policy within a user data repository (UDR).

The SMF may provide a session management function, and respective sessions may be managed by different SMFs if the UE has a plurality of sessions.

Specifically, the SMF supports functions of managing a session (for example, establishing, modifying, and releasing a session including maintenance of a tunnel between the UPF and the AN node), allocating and managing (including selective authentication of) a UE IP address, selecting and controlling a user plane (UP) function, configuring traffic steering for routing traffic from the UPF to a proper destination, termination of an interface for policy control functions, trying a control part of a policy and quality of service (QoS), lawful intercept (for an SM event and an interface for an LI system), termination of an SM part of a NAS message, downlink data notification, an initiator of AN-specific SM information (transmitting N2 to the AN via the AMF), determining a session and service continuity (SSC) mode of a session, and roaming.

Some or all of the functions of the SMF may be supported within a single instance of one SMF.

The UDM stores subscription data and policy data of the user. The UDM includes two parts, that is, an application front end (FE) and a user data repository (UDR).

The FE includes a UDM FE that serves to process location management, subscription management, and credential and a PCF that serves to control a policy. The UDR stores data required for functions provided by the UDM-FE and a policy profile required by the PCF. Data stored in the UDR includes user subscription data and policy data including a subscription Identifier (ID), security credential, access-and mobility-related subscription data, and session-related subscription data. The UDM-FD supports functions of accessing subscription information stored in the UDR, processing authentication credential, handling user identification, authenticating, registering access/managing mobility, managing subscription, and managing an SMS.

The UPF transmits a downlink PDU received from the DN to the UE via the (R)AN and transmits an uplink PDU received from the UE to the DN via the (R)AN.

Specifically, the UPF supports functions of an anchor point for intra/inter radio access technology (RAT) mobility, an external PDU session point of interconnect to a data network, packet routing and forwarding, a user plane part of trying packet inspection and policy rule, lawful intercept, reporting an amount of traffic usage, an uplink classifier for supporting routing to traffic flow to a data network, a branching point for supporting a multi-homed PDU session, handling QoS for a user plane ((for example, packet filtering, gating, uplink/downlink rate), uplink traffic verification (SDF mapping between service data flow (SDF) and QoS flow), marking a transport level packet within uplink and downlink, buffering a downlink packet, and triggering a downlink data notification. Some or all of the functions of the UPF may be supported within a single instance of one UPF.

The AF mutually operates with a 3GPP core network to provide service (for example, supports functions of influencing an application on traffic routing, accessing network capability exposure, interacting with a policy framework for controlling a policy).

The (R)AN is referred to as a new radio access network that supports all of an evolved universal terrestrial radio access (UTRA) (E-UTRA), which is an evolved version of the 4G radio access technology, and a new radio (NR) access technology (for example, next-generation node B (gNB)).

The gNB supports functions for managing radio resources (that is, radio bearer control, radio admission control, connection mobility control, dynamic allocation of resources to the UE in uplink/downlink (that is, scheduling)), compressing an Internet protocol (IP) header, encrypting a user data stream and performing integrity protection, selecting the AMF in UE attachment when routing to the AMF is not determined based on information provided to the UE, user plane data routing to UPF(s), control plane information routing to the AMF, setting and releasing connection, scheduling and transmitting a paging message (generated from the AMF), scheduling and transmitting system broadcast information (generated from operating and maintenance (O&M)), performing measurement for mobility and scheduling and configuring a measurement report, transport level packet marking in uplink, managing session, supporting network slicing, managing QoS flow and performing mapping to a data radio bearer, supporting the UE in an inactive mode, distributing NAS messages, selecting a NAS node, sharing a radio access network, dual connectivity, and tight interworking between NR and E-UTRA.

The UE refers to a user device. The user device may be referred to as a terminal, a mobile equipment (ME), a mobile station (MS), and the like. Further, the user device may be a portable device, such as a notebook, a mobile phone, a personal digital assistant (PDA), a smartphone, or a multimedia device, or may be a device, which cannot be portable, such as a personal computer (PC) or a vehicle-mounted device.

Figure 5:
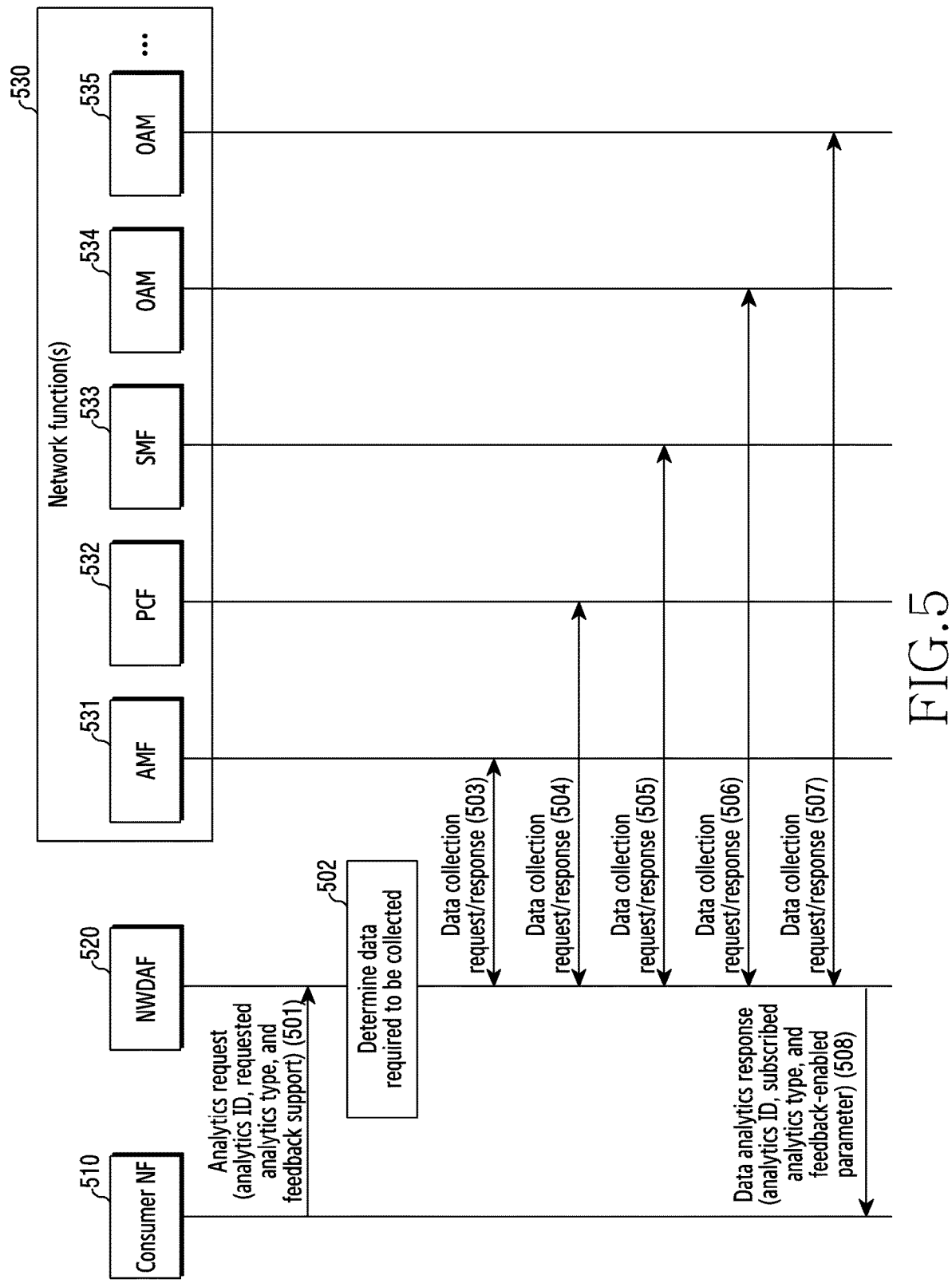
FIG. 5 illustrates a process in which a consumer network function makes a request for an operation proposal to a network analytics function in a wireless communication system according to an embodiment of the disclosure.

FIG. 1 does not illustrate an unstructured data storage network function (UDSF), a structured data storage network function (SDSF), a network exposure function (NEF), and an NF repository function (NRF) for clarity of description, but all NFs illustrated in FIG. 5 may perform mutual operations with the UDSF, the NEF, and the NRF as necessary.

The NEF provides a $3^{rd}$ party, internal exposure/re-exposure, an application function, and a means for safely exposing services and capabilities for edge computing, provided by 3GPP network functions. The NEF receives information (based on exposed capability (capabilities) of other network function(s)) from other network function(s). The NEF may store received information as structuralized data through an interface standardized as a data storage network function. The stored information may be re-exposed to other network function(s) and application function(s) by the NEF and may be used for another purpose, such as analysis.

The NRF supports a service discovery function. The NRF receives an NF discovery request from an NF instance and provides information on the discovered NF instance to the NF instance. Further, the NRF maintains available NF instances and service supported thereby.

The SDSF is a selective function for supporting a function of storing and retrieving information as data structured by any NEF.

The UDSF is a selective function for supporting a function of storing and retrieving information as data unstructured by any NF.

Meanwhile, FIG. 1 illustrates a reference model in the case in which the UE accesses one DN through one PDU session for convenience of description, but the disclosure is not limited thereto.

The UE may simultaneously access two (that is, local and central) data networks through multiple PDU sessions. At this time, two SMFs may be selected for different PDU sessions. However, each SMF may have a capability of controlling both the local UPF and the central UPF within the PDU session.

Further, the UE may simultaneously access two (that is, local and central) data networks within a single PDU session.

In the 3GPP system, a conceptual link connecting NFs within the 5G system is defined as a reference point. Reference points included in the 5G system architecture of FIG. 1 are described below.

Figure 2:
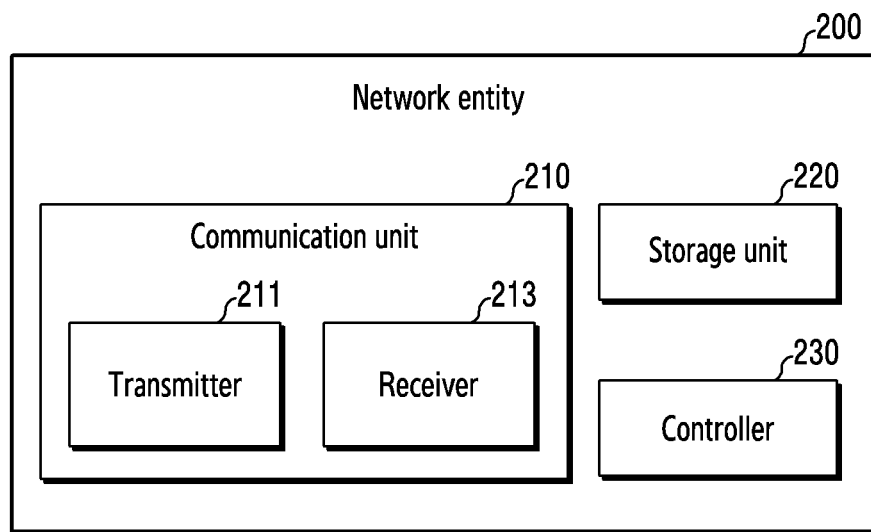
FIG. 2 illustrates a configuration of a network entity in a wireless communication system according to an embodiment of the disclosure.

NG1: reference point between UE and AMF
NG2: reference point between (R)AN and AMF
NG3: reference point between (R)AN and UPF
NG4: reference point between SMF and UPF
NG5: reference point between PCF and AF
NG6: reference point between UPF and data network
NG7: reference point between SMF and PCF
NG8: reference point between UDM and AMF
NG9: reference point between two core UPFs
NG10: reference point between UDM and SMF NG11: reference point between AMF and SMF
NG12: reference point between AMF and AUSF
NG13: reference point between UDM and authentication server function (AUSF)
NG14: reference point between two AMFs
NG15: reference point between PCF and AMF in non-roaming scenario and reference point between PCF within visited network and AMF in roaming scenario FIG. 2 illustrates a configuration of a network entity in a wireless communication system according to an embodiment of the disclosure.

The network entity according to the disclosure is a concept including a network function according to a system implementation. The term "~unit" or "~er" used hereinafter may refer to the unit for processing at least one function or operation and may be implemented in hardware, software, or a combination of hardware and software.

Referring to FIG. 2, the network entity according to various embodiments may include a communication unit or transceiver 210, a storage unit 220, and a controller 230 for controlling the overall operation of the network entity 200.

The communication unit 210 transmits and receives signals to and from other network entities. Accordingly, all or part of the communication unit 210 may be referred to as a "transmitter 211", a "receiver 213", or a "transceiver 210".

The storage unit 220 stores data, such as a basic program, an application, and configuration information for the operation of the network entity 200. The storage unit 220 may include volatile memory, nonvolatile memory, or a combination of volatile memory and nonvolatile memory. The storage unit 220 provides stored data in response to a request from the controller 240.

The controller 230 controls the overall operation of the network entity 200. For example, the controller 230 transmits and receives a signal through the communication unit 210. The controller 230 records data in the storage unit 220 and reads the same. The controller 230 may perform the functions of a protocol stack required by the communication standard. To this end, the controller 230 may include a circuit, an application-specific circuit, at least one processor, or a micro-processor, or may be a part of the processor. Further, the part of the communication unit 210 or the controller 330 may be referred to as a communications processor (CP). The controller 230 may control the network entity 200 to perform one operation according to various embodiments.

The communication unit 210 and the controller 230 should be necessarily implemented as separate modules but may be implemented as one element, such as a single chip or software block. The communication unit 210, the storage unit 220, and the controller 230 may be electrically connected. The operations of the network entity 200 may be implemented by including the storage unit 220 for storing the corresponding program code within the network entity 200.

The network entity 200 may include a network node and may be one of base station (RAN), AMF, SMF, UPF, NF, NEF, NRF, CF, NSSF, UDM, AF, AUSF, service control point (SCP), UDSF, context storage, operations, administration, and maintenance (OAM), EMS, configuration server, and Identifier (ID) management server.

Various embodiments provide a method and an apparatus for automating management of a mobile communication network.

Various embodiments provide a method and an apparatus for transferring a recommendation of the optimal operation between a network data analytics function and a network function in order to automate network management and providing a feedback thereof.

Further, various embodiments provide a method of determining an additional operation based on the received feedback, generating a recommendation, and transmitting the recommendation.

According to various embodiments of the disclosure, it is possible to improve the automation performance and reduce a time spent for optimization by allowing the network analytics function to directly control a system. Further, according to various embodiments of the disclosure, it is possible to improve the accuracy of network function control and the performance of the entire system through improvement of the performance of learning using the feedback.

Figure 3:
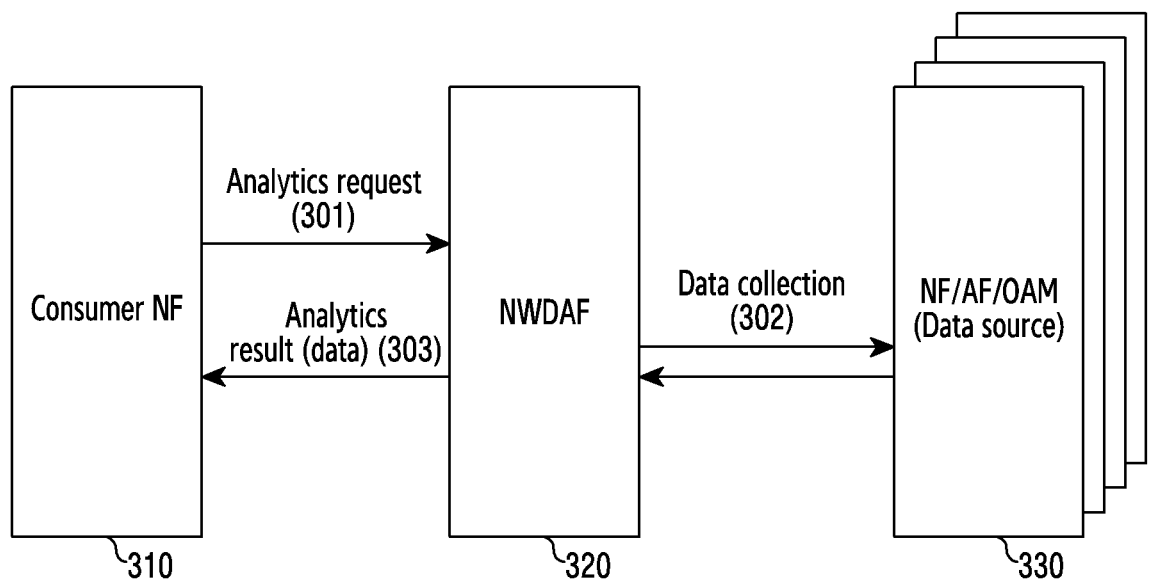
FIG. 3 illustrates a process for performing network automation of a wireless network in a wireless communication system according to an embodiment of the disclosure.

FIG. 3 illustrates a process in which a wireless communication system performs network automation of a wireless network according to an embodiment of the disclosure.

FIG. 3 schematically illustrates a method of network automation in a wireless communication system according to an embodiment of the disclosure.

Each element function 330 of the network, such as an access and mobility management function (AMF), a session management function (SMF), operations, administration, and maintenance (OAM), and a radio access network (RAN) included in the wireless network may be a consumer network function (consumer NF) 310 making a request for an analytics result of a network data analytics function (NWDAF) 320.

Referring to FIG. 3, in operation 301, the consumer network function 310 makes a request for analytics to the network data analytics function 320.

In operation 302, the network data analytics function 320 may collect data from each network function 330 in order to generate the result of analytics requested from the consumer network function 310 and analyze the data collected to the consumer network function 310.

In operation 303, the network data analytics function 320 transmits the analytics result to the consumer network function 310 transmitting the request for the analytics. The consumer network function 310 receiving the analytics result uses the analytics result received from the network data analytics function 320 during a process of determining a control parameter and operation.

Figure 4:
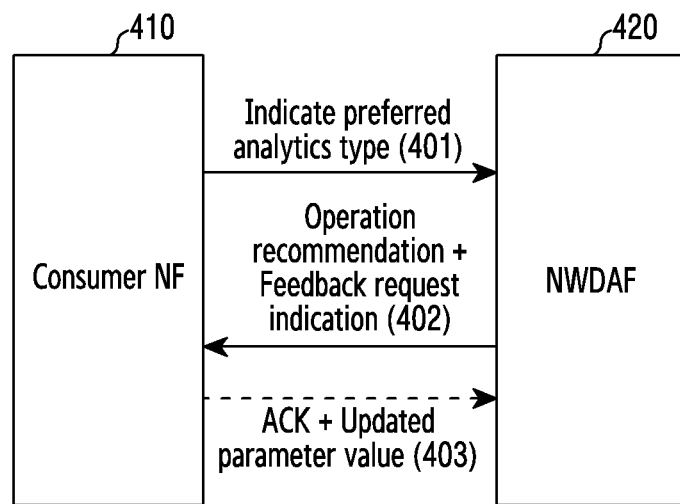
FIG. 4 illustrates a process of performing network automation in a wireless communication system according to an embodiment of the disclosure.

FIG. 4 illustrates a process of performing network automation in a wireless communication system according to an embodiment of the disclosure.

Specifically, FIG. 4 schematically illustrates a network automation method in a wireless communication system according to various embodiments.

Referring to FIG. 4, the network automation method is a method of directly proposing an operation for each function to a consumer network function 410 through a network data analytics function 420 in order to remove a disadvantage of the network automation method using the network data analytics function 320 of FIG. 3 and receiving a feedback for the result of application of the proposed operation from the consumer network function 410 so as to improve the performance of the network automation.

Referring to FIG. 4, the consumer network function 410 transmits a request message for the analytics result to the network data analytics function 420 in operation 401. According to an embodiment of the disclosure, when transmitting the request message of operation 401, the consumer network function 410 may designate and indicate the preferred analytics type among analytics forms supported by the consumer network function 410.

In operation 402, the network data analytics function 420 may select provision of the operation recommendation instead of analyzed data as the analytics result. Further, the consumer network function 410 may include information indicating whether the consumer network function supports the feedback in the request message.

According to an embodiment of the disclosure, it is possible to omit an indication parameter designating the analytics type by pre-configuring a default value of the analytics type. In this case, when the network data analytics function 420 receives the request of operation 401 from the consumer network function 410, the network data analytics function 420 transmits the analytics result in the pre-designated analytics type to the consumer network function 410 in operation 402. According to an embodiment of the disclosure, indication information indicating whether the feedback is supported may not be included in the request message of operation 401 by pre-designating a corresponding default value.

The network data analytics function 420 may transmit the operation recommendation to the consumer network function 410 as the analyzed result in which case whether the consumer network function 410 needs to provide the feedback may be designated through an indication. The network data analytics function 420 may or may not configure a feedback request indication and transmit the feedback request indication to the consumer network function 410, thereby reducing an additional signal load due to the feedback and controlling transmission of the feedback as necessary.

In operation 403, the consumer network function 410 applies the received operation recommendation and transmit the result of the application including updated parameter values to the network data analytics function 420. The network data analytics function 420 may update network state information stored as the application result received from the consumer network function 410, analyze the received application result, and determine whether to transmit the operation recommendation to the additionally required consumer network function 410.

FIG. 5 illustrates a process in which a consumer network function makes a request for an operation recommendation to a network analytics function in a wireless communication system according to an embodiment of the disclosure.

Specifically, FIG. 5 illustrates an example of a process for applying a method according to various embodiments.

The type of analytics data required by the consumer network function 510 and information indicating whether the consumer network function 510 supports a feedback for the analytics result in operation 501 in which the consumer network function 510 makes a request for analytics data to the network data analytics function 520 are included in the embodiment of FIG. 5.

Referring to FIG. 5, in operation 501, the consumer network function 510 transmits a request message for the analytics data to the network data analytics function 520. The request message for the analytics data includes analytics ID for designating the content of analytics data, a requested analytics type for designating the type of analytics data, and feedback support information indicating whether a function of applying the received analytics result and then providing a feedback for the result is supported. At this time, when the requested analytics type is preconfigured in system information according to an embodiment of the disclosure, a parameter of the requested analytics type may be omitted from the analytics request message of operation 501. Similarly, when the information indicating whether the network function is supported is registered in the network analytics function or preconfigured through another method, a feedback support parameter may be omitted from the analytics request message of operation 501.

In operation 502, the network data analytics function 520 identifies the content and type of analytics data designated by the analytics ID and the requested analytics type included in the analytics request message received from the consumer network function 510 and determines input data required to be collected to generate an appropriate analytics result.

In operations 503 to 507, the network data analytics function 520 transmits a data collection request message that makes a request for transmitting data to the relevant network functions 530 (531, 532, 533, 534, and 535) to collect required input data and collect the relevant data from each network function 530 through a data collection response message. The illustrated example is only for generally expressing the process, and each collection process is performed with the required network function 530 but does not need to be necessarily performed with all network functions 530. Further, the data collection request and response signal transmission/reception may be repeatedly performed several times as necessary.

In operation 508, the network data analytics function 520 transmits a data analytics response message to the consumer network function 510 in response to the data analytics request signal message. The data analytics response message of operation 508 does not need to be necessarily performed after operations 503 to 507, and may be performed immediately after operation 502 according to selection in the process according to the embodiment. The data analytics response message of operation 508 may include an analytics ID requested by the consumer network function 510, an accepted subscribed analytics type indicating a type of the analytics result, and a feedback-enabled parameter indicating whether it is required to provide a feedback for the analytics result provided by the network data analytics function 520. When the feedback-enabled parameter is configured as "On(1)", the consumer network function 510 transmits a feedback for each analytics result received from the network analytics function 520 to the network analytics function 520. When the feedback-enabled parameter is configured as "Off(0)", if there is no separate indication from the network analytics function 520, the consumer network function 510 does not transmit a feedback for the received analytics result.

Figure 6:
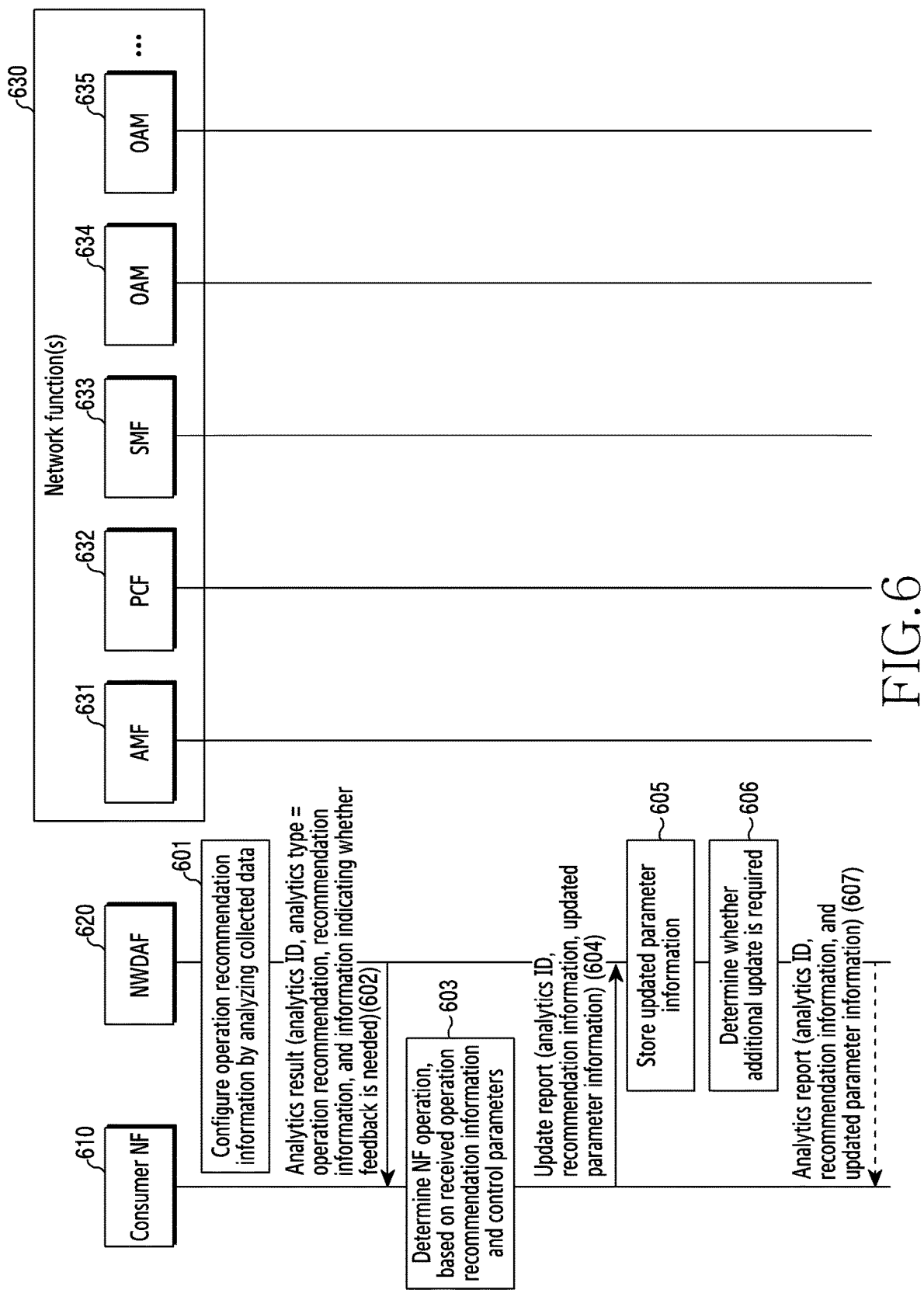
FIG. 6 illustrates a process in which a network analytics function transmits an operation proposal to a consumer network function and receives feedback in a wireless communication system according to an embodiment of the disclosure.

FIG. 6 illustrates a process in which a network analytics function transmits an operation recommendation to a consumer network function and receives feedback in a wireless communication system according to an embodiment of the disclosure.

Specifically, FIG. 6 illustrates an example of a process in which a network data analytics function 620 transmits an operation recommendation and a feedback by applying a recommendation scheme and improves an optimization process therethrough according to various embodiments.

Referring to FIG. 6, in operation 601, the network data analytics function 620 analyzes network data collected from network functions 630 (631, 632, 633, 634, and 635), determines operations (for example, control parameter update, state change, and control message transmission/reception) required by a consumer network function 610 based on the analytics result, and configures operation recommendation information corresponding thereto.

In operation 602, the network data analytics function 620 transmits the analytics result including recommendation information that is a parameter including an operation recommendation to the consumer network function 610. At this time, the analytics result control message for transmitting the analytics result may include feedback-required indication information (information indicating whether a feedback is needed). The consumer network function 610 receiving the control message in which the feedback-required indication is configured performs a required function according to the received recommended operation information and then transmits a control message for feeding back the result to the network data analytics function 620. According to embodiments of the disclosure, when the consumer network function 610 is reconfigured in a system to always provide a feedback or is configured to always provide a feedback through a feedback-enabled parameter by the network data analytics function 620 in a previous data request operation, the feedback-required indication information of the analytics result control message may be omitted. Further, according to another embodiment, the network data analytics function 620 may control a network load generated due to an additional message for transmitting a feedback through a method of configuring (or including) the feedback-required indication of the analytics result control message only in a situation in which the feedback is necessary.

In operation 603, the consumer network function 610 determines and performs a relevant parameter and procedure based on the received operation recommendation information.

In operation 604, the consumer network function 610 transmits an updated network parameter and state information to the network data analytics function 620 through an update report message as the execution result. The update report message of operation 604 may include operation control information received from the network data analytics function 620 and the corresponding updated control parameter and state information.

In operation 605, the network data analytics function 620 stores the updated control parameter and network state information received from the consumer network function 610.

In operation 606, the network data analytics function 620 determines whether a control operation for the consumer network function 610 is additionally required based on the received control parameter and network state information. At this time, the selected consumer network function 610 does not have to be necessarily the same as the previously selected consumer network function and may be selected as a required function from all consumer network functions 610 previously making a request for the analytics result to the network data analytics function 620.

In operation 607, the network data analytics function 620 additionally transmits an analytics result control message including the operation recommendation to the consumer network function 610 selected through operation 606 as necessary. The consumer network function 610 receiving the analytics result message performs the process of operations 603 and 604 and additionally performs the process of operations 605 and 606, and the network data analytics function 620 performs the process of operation 607 again and repeats the process of operations 603 to 606 as many times as necessary. Through such processes, when the control parameter and the state of the consumer network function 610 are changed, the network data analytics function 620 may control the performance of required optimization for all network functions 630 (631, 632, 633, 634, and 635) through an immediate feedback and provides overall performance improvement compared to the existing scheme of periodically collecting and applying the network state change.

Figure 7:
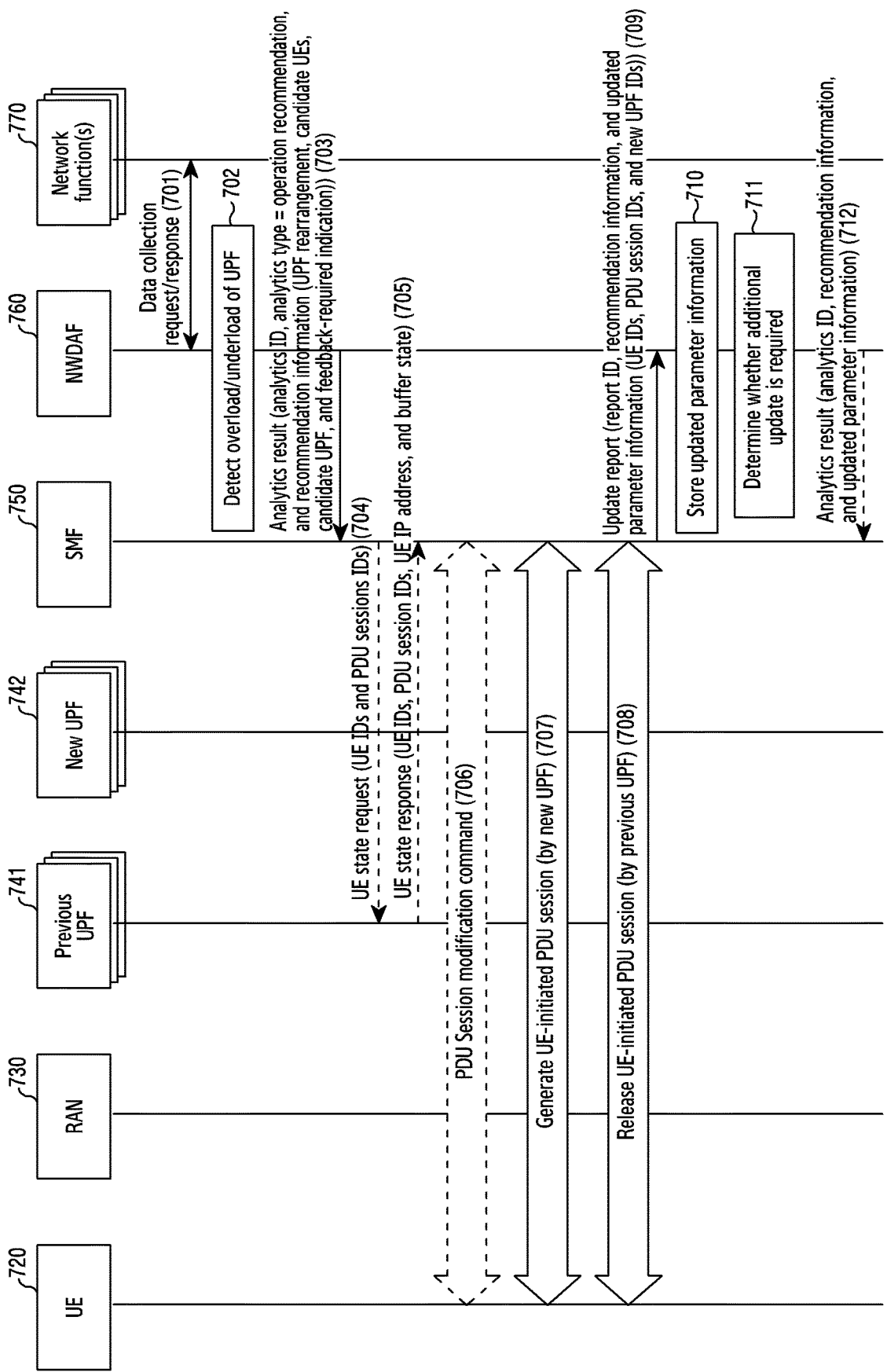
FIG. 7 illustrates a process of optimizing a user plane function (UPF) in a wireless communication system according to an embodiment of the disclosure.

FIG. 7 illustrates a process of optimizing a user plane function (UPF) in a wireless communication system according to an embodiment of the disclosure.

Specifically, FIG. 7 illustrates an example of a process in which a network analytics function 760 optimizes data plane functions 741 and 742 according to various embodiments.

Referring to FIG. 7, in operation 701, the network data analytics function 760 collects required network data from a required network function 770 through the process according to the embodiment of FIG. 4.

In operation 702, the network data analytics function 760 analyzes the collected network data and detects whether the UPF 741 is in an overload state or an underload state.

When the overload or the underload of the UPF 741 is detected in operation 702, the network data analytics function 760 transmits an analytics result message including information making a request for re-allocating the UPF 742 to the SMF 750 in order to re-allocate the UPF 742 in operation 703. The analytics result message of operation 703 may include an analytics ID and an analytics type. The analytics type may include operation recommendation and recommendation information. The recommendation information may include UPF rearrangement, candidate UEs, a candidate UPF, and a feedback-required indication.

Through the process of operations 704 to 708, the SMF 750 may use information of a candidate UE 720 positioned near radio access network (730) and information of the candidate UPF 742 received from the network data analytics function 760 to perform a series of processes for re-allocating the UPF 742 for the candidate UE 720.

In operation 704, the SMF 750 transmits a UE state request message to the UPF 741. The UE state request message may include UE IDs and PDU session IDs.

In operation 705, the SMF 750 receives a UE state response message from the UPF 741. The UE state response message may include UE IDs, PDU session IDs, and UE IP addresses, and a buffer state.

In operation 706, the SMF 750 and the UE 720 transmit a message of a PDU session modification command In operation 707, the SMF 750 and the UE 720 transmit a UE-initiated PDU session establishment message for the new UPF 742.

In operation 708, the SMF 750 and the UE 720 transmit a UE-initiated PDU session release message for the previous UPF 741.

In operation 709, the SMF 750 transmits an update report message to the network data analytics function 720 and thus transmits information on the result of the UPF reallocation. Through the update report message of operation 709, the network data analytics function 760 may immediately acquire information indicating the UPF 742 that is reallocated and UEs 720 to which the UPF 742 is reallocated and a PDU session of the corresponding UE 720 that is reconfigured. The update report message of operation 709 may include a report ID, recommendation information, and updated parameter information. The updated parameter information may include UE IDs, PDU session IDs, and new UPF IDs.

In operation 710, the network analytics function 760 stores the updated parameter information.

In operation 711, the network data analytics function 760 determines whether there is an additionally required operation recommendation. Specifically, in operation 711, the network analytics function 760 may determine whether an additional update is required.

In operation 712, the network data analytics function 760 may perform an additionally required control by transmitting an analytics result message. The analytics result message of operation 712 may include an analytics ID, recommendation information, and updated parameter information.

Figure 8:
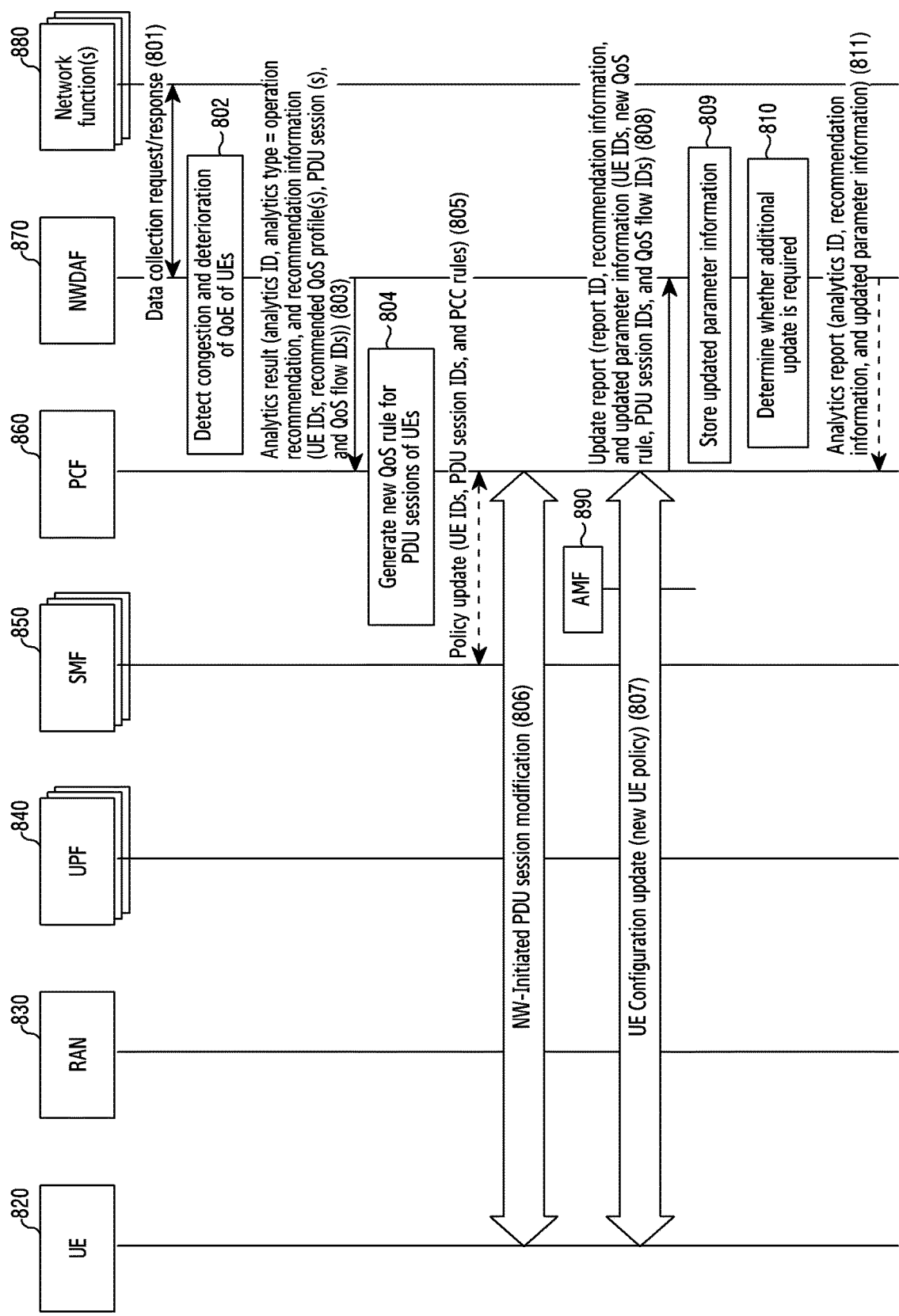
FIG. 8 illustrates a process for optimizing a quality of service (QoS) profile for each user equipment (UE) in a wireless communication system according to an embodiment of the disclosure.

FIG. 8 illustrates a process for optimizing a quality of service (QoS) profile for each UE in a wireless communication system according to an embodiment of the disclosure.

Specifically, FIG. 8 illustrates a process in which a network analytics function 870 updates a QoS policy of a UE 820 positioned near RAN 830.

Referring to FIG. 8, in operation 801, the network data analytics function 870 collects network state data from a required network function 880.

In operation 802, the network data analytics function 870 determines that a quality of experience of service for a series of UEs 820 through analytics of the network state data collected in operation 801. Specifically, in operation 802, the network data analytics function 870 detects congestion and whether quality of experience (QoE) of the UEs 820 deteriorates through analytics of the network state data collected in operation 801.

In operation 803, the network data analytics function 870 transmits the analytics result message including the operation recommendation that proposes an update of a QoS profile for corresponding PDU sessions of the corresponding UEs 820 to a policy control function (PCF) 860 that is a policy server. The analytics result message of operation 803 may include an analytics ID and an analytics type. The analytics type may include the operation recommendation and recommendation information. The recommendation information may include UE IDs, recommended QoS profiles, PDU sessions, and QoS flow IDs.

In operation 804, the PCF 860 selects the UE 820 to change a QoS profile based on the received operation recommendation. Specifically, in operation 804, the PCF 860 may generate a new QoS rule for PDU sessions of UEs 820 based on the received operation recommendation.

In operation 805, the PCF 860 may allow QoS control information for the corresponding PDU session of the corresponding UE 820 to be updated by transmitting the updated QoS profile to the SMF 850 positioned near AMF 890. Specifically, in operation 805, the PCF 860 and the SMF 850 transmit a policy update message. The policy update message may include UE IDs, PDU session IDs, and policy and charging control (PCC) rules.

In operation 806, the SMF 850 performs a required PDU session change process with the UE 820 and the UPF 840 by reflecting the QoS profile change information received from the PCF 860. Specifically, in operation 806, the PCF 860 and the UE 820 transmit an NW-initiated PDU session modification message.

In operation 807, the SMF 850 reports the result of the PDU session modification to the PCF 860. Specifically, in operation 807, the PCF 860 and the UE 820 transmit a UE configuration update message, that is, a new UE policy message.

In operation 808, the PCF 860 transmits the result of applying the QoS profile change for the corresponding PDU sessions of the corresponding UEs 820 to the network data analytics function 870. Specifically, in operation 808, the PCF 860 transmits an update report message to the network data analytics function 870. The update report message of operation 808 may include a report ID, recommendation information, and updated parameter information. The updated parameter information may include UE IDs, a new QoS rule, PDU session IDs, and QoS flow IDs.

In operation 809, the network data analytics function 870 stores the updated parameter information received in operation 808.

In operation 810, the network data analytics function 870 determines whether additional analysis is required based on the received result. Specifically, in operation 810, the network data analytics function 870 may determine whether an additional update is required.

When the network data analytics function 870 determines that the additional analytics is required in operation 809, the network data analytics function 870 additionally transmits an analytics report (analytics result) message including an additional operation recommendation to the PCF 860 in operation 811. The analytics report message of operation 811 may include an analytics ID, recommendation information, and updated parameter information.

Figure 9:
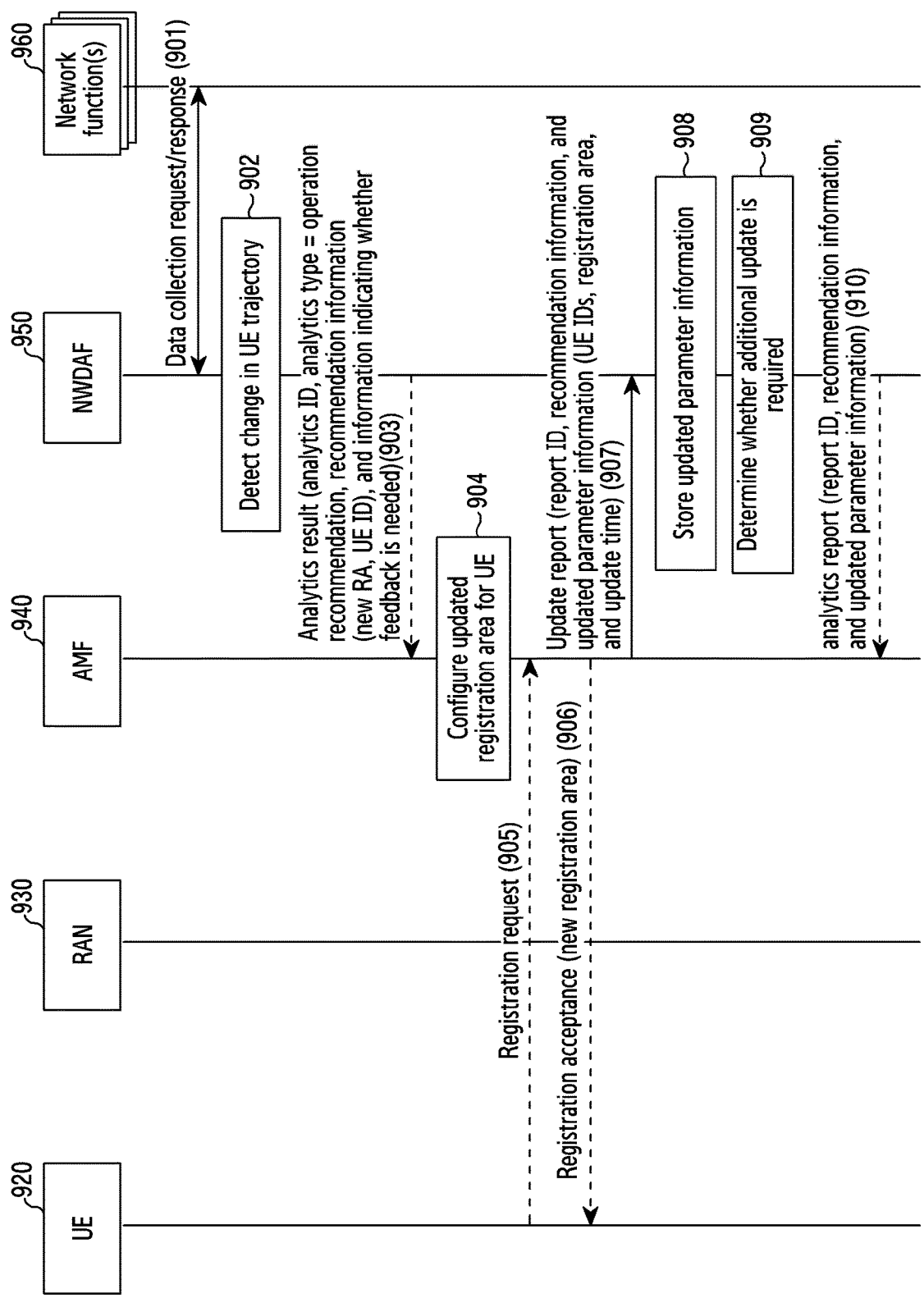
FIG. 9 illustrates a process of optimizing a registration area for each terminal in a wireless communication system according to an embodiment of the disclosure.

FIG. 9 illustrates a process of optimizing a registration area for each UE in a wireless communication system according to an embodiment of the disclosure.

Specifically, FIG. 9 illustrates an example of a process in which a network analytics function 950 updates a registration area of a UE 920 positioned near RAN 930 according to various embodiments.

Referring to FIG. 9, in operation 901, the network data analytics function 950 collects network state data from a required network function 960.

In operation 902, the network data analytics function 950 determines that there is a need to update the registration area for specific UEs 920 through analytics of the network state data collected in operation 901. Specifically, in operation 902, the network data analytics function 950 detects a change in UE trajectory for the specific UEs 920 through analytics of the network state data collected in operation 901.

In operation 903, the network data analytics function 950 transmits operation recommendation information including a candidate UE 920 to update a registration area and a candidate registration area value to an AMF 940 through an analytics result message. Specifically, in operation 903, the network data analytics function 950 transmits an analytics result message to the AMF 940. The analytics result message may include an analytics ID, an analytics type, and an indication indicating whether a feedback is needed. The analytics type may include an operation recommendation and recommendation information. The recommendation information may include a new registration area (RA) and a UE ID.

In operation 904, the AMF 940 selects the UE 920 to update the registration area based on the received operation recommendation. Specifically, in operation 904, the AMF 940 may configure the updated registration area for the UE.

When the AMF 940 receives a registration request message from the corresponding UEs 920 in operation 905, the AMF 940 uses the received registration area information and updates registration area information of the UE 920 corresponding to the registration request message of operation 905 in operation 906. Specifically, in operation 906, the AMF 940 may transmit a registration acceptance message including information on a new registration area to the UE 920.

In operation 907, the AMF 940 transmits the result of applying the change in the registration area of the corresponding UEs 920 to the network data analytics function 950. Specifically, in operation 907, the AMF 940 may transmit an update report message to the network data analytics function 950. The update report message may include a report ID, recommendation information, and updated parameter information. The updated parameter information may include UE IDs, a registration area, an update time.

In operation 908, the network data analytics function 950 stores updated parameter information.

In operation 909, the network data analytics function 950 determines whether additional analytics is required based on the received result. Specifically, in operation 909, the network data analytics function 950 may determine whether an update is additionally required.

When the network data analytics function 950 determines that the additional analytics is required in operation 909, the network data analytics function 950 additionally transmits an analytics report (analytics result) message including an additional operation recommendation to the AMF 940 in operation 910. The analytics report message of operation 910 may include an analytics ID, recommendation information, and updated parameter information.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network data analytics function (NWDAF) entity in a wireless communication system, the method comprising:
   receiving, from a network function (NF) entity, a request message for analysis result of network data;
   transmitting, to the NF entity, a first message including a first analysis result of the network data including first recommendation operation information and a feedback requirement indicator indicating whether the NF entity is required to transmit a feedback;
   receiving, from the NF entity, a second message in response to the first message, the second message including a result of an operation based on the first message; and
   updating the analysis result based on the second message,
   wherein the result of the operation includes updated network parameters information, and
   wherein the request message includes a requested analysis type among analysis forms supported by the NF entity and feedback support information indicating whether the NF entity supports the feedback.

2. A network data analytics function (NWDAF) entity in a wireless communication system, the NWDAF entity comprising:
   a transceiver; and
   a controller coupled with the transceiver,
   wherein the controller is configured to:
      receive, from a network function (NF) entity, a request message for analysis result of network data,
      transmit, to the NF entity, a first message including a first analysis result of the network data including first recommendation operation information and a feedback requirement indicator indicating whether the NF entity is required to transmit a feedback,
      receive, from the NF entity, a second message including a result of an operation based on the first message in response to the first message, and
      update the analysis result based on the second message,
   wherein the result of the operation includes updated network parameters information, and
   wherein the request message includes a requested analysis type among analysis forms supported by the NF entity and feedback support information indicating whether the NF entity supports the feedback.

3. The method of claim 1, wherein the feedback requirement indicator indicates a requirement for a feedback based on the first recommendation operation information.

4. The method of claim 1, further comprising:
   identifying whether a further operation for the NF entity is required based on the updated network parameters information;
   in case that the further operation is determined to be required for the NF entity, generating second recommendation operation information; and
   transmitting, to the NF entity, a third message including a second analysis result including the second recommendation operation information.

5. The NWDAF entity of claim 2, wherein the feedback requirement indicator indicates a requirement for a feedback based on the first recommendation operation information.

6. The NWDAF entity of claim 2, wherein the controller is further configured to:

identify whether a further operation for the NF entity is required based on the updated network parameters information, in case that the further operation is determined to be required for the NF entity, generate second recommendation operation information, and transmit, to the NF entity, a third message including a second analysis result including the second recommendation operation information.

\* \* \* \* \*